US012285919B2

(12) United States Patent
Broome et al.

(10) Patent No.: US 12,285,919 B2
(45) Date of Patent: Apr. 29, 2025

(54) METHOD OF JOINING SEGMENTS OF A COMPOSITE COMPONENT

(71) Applicant: General Electric Company, Schenectady, NY (US)

(72) Inventors: Peter Anthony Broome, Park Ridge, IL (US); Allen Russel Hall, New Orleans, LA (US); Chad Allen Boudoin, New Orleans, LA (US)

(73) Assignee: LM Wind Power US Technology ApS, Kolding (DK)

( * ) Notice: Subject to any disclaimer, the term of this patent is extended or adjusted under 35 U.S.C. 154(b) by 12 days.

(21) Appl. No.: 18/259,784

(22) PCT Filed: Dec. 23, 2021

(86) PCT No.: PCT/IB2021/062272
§ 371 (c)(1),
(2) Date: Jun. 29, 2023

(87) PCT Pub. No.: WO2022/144731
PCT Pub. Date: Jul. 7, 2022

(65) Prior Publication Data
US 2024/0066810 A1    Feb. 29, 2024

(30) Foreign Application Priority Data

Dec. 30, 2020 (GB) ..................................... 2020710

(51) Int. Cl.
*B29L 31/08* (2006.01)
*B29C 65/00* (2006.01)
(Continued)

(52) U.S. Cl.
CPC ........ *B29C 66/81455* (2013.01); *B29C 65/26* (2013.01); *B29C 65/4835* (2013.01);
(Continued)

(58) Field of Classification Search
CPC ... B29C 65/26; B29C 65/4835; B29C 66/634; B29C 66/636; B29C 66/721;
(Continued)

(56) References Cited

U.S. PATENT DOCUMENTS 1,879,225 A    9/1932   Haw
1,887,424 A    11/1932  Perazzoli
(Continued)

FOREIGN PATENT DOCUMENTS

DE    102007026100 A1    12/2008
DE    102014118004 B3    3/2016
(Continued)

OTHER PUBLICATIONS

GB Search Report Corresponding to GB2020710.6 on Jun. 24, 2021.
PCT International Search Report & Opinion Corresponding to PCT/IB2021/062272 on Mar. 24, 2022.

*Primary Examiner* — Sang K Kim
(74) *Attorney, Agent, or Firm* — Dority & Manning, P.A.

(57) ABSTRACT

Methods are provided for joining a composite component, such as a rotor blade of a wind turbine. Accordingly, a first blade segment is provided and a bladder assembly is positioned thereon. Additionally, an adhesive element is positioned in a first position on the first blade segment. A second blade segment is positioned with the first blade segment so as to define an inner cavity therebetween. The inner cavity contains the adhesive element and the bladder assembly, but the adhesive element does not contact the second blade segment while in the first position. The bladder assembly is inflated to transition the adhesive element to a second position in contact with both the first blade segment and the second blade segment. With the adhesive element in contact (Continued)

with both blade segments, the adhesive element is allowed to cure in order to secure the blade segments to one another.

14 Claims, 11 Drawing Sheets

(51) Int. Cl.
  *B29C 65/26* (2006.01)
  *B29C 65/48* (2006.01)
  *F03D 1/06* (2006.01)
(52) U.S. Cl.
  CPC .......... *B29C 66/634* (2013.01); *B29C 66/636* (2013.01); *B29C 66/721* (2013.01); *B29C 66/9221* (2013.01); *B29C 66/92441* (2013.01); *F03D 1/0675* (2013.01); *B29L 2031/085* (2013.01); *F05B 2240/302* (2013.01)
(58) Field of Classification Search
  CPC .......... B29C 66/81455; B29C 66/9221; B29C 66/92441; F03D 1/0675; B29L 2031/085; F05B 2240/302
  See application file for complete search history.

(56) References Cited

U.S. PATENT DOCUMENTS

| | | | |
|---|---|---|---|
| 2,921,492 | A | 1/1960 | Worth |
| 3,259,021 | A | 7/1966 | Appleton et al. |
| 3,450,001 | A | 6/1969 | Fortune |
| 3,456,555 | A | 7/1969 | Dunlap |
| 3,476,013 | A | 11/1969 | Zemberry |
| 4,102,245 | A | 7/1978 | Cousins |
| 4,389,162 | A | 6/1983 | Doellinger et al. |
| 4,434,824 | A | 3/1984 | Bussey |
| 4,489,634 | A | 12/1984 | Volk |
| 4,614,466 | A | 9/1986 | Snyder |
| 4,615,654 | A | 10/1986 | Shaw |
| 4,740,453 | A | 4/1988 | Nakamura et al. |
| 4,770,216 | A | 9/1988 | Ruscak |
| 5,333,385 | A | 8/1994 | Chou |
| 5,354,175 | A | 10/1994 | Coleman et al. |
| 5,468,099 | A | 11/1995 | Wheetley et al. |
| 5,499,904 | A | 3/1996 | Wallace et al. |
| 6,158,666 | A | 12/2000 | Banks et al. |
| 6,467,385 | B1 | 10/2002 | Buttrick et al. |
| 6,843,328 | B2 | 1/2005 | Boyl-Davis et al. |
| 7,216,408 | B2 | 5/2007 | Boyl-Davis et al. |
| 7,334,989 | B2 | 2/2008 | Arelt |
| 7,364,407 | B2 | 4/2008 | Grabau et al. |
| 7,481,624 | B2 | 1/2009 | Wobben |
| 7,540,716 | B2 | 6/2009 | Wobben |
| 7,690,895 | B2 | 4/2010 | Moroz |
| 7,740,453 | B2 | 6/2010 | Zirin et al. |
| 7,794,183 | B2 | 9/2010 | Wright et al. |
| 7,794,209 | B2 | 9/2010 | Wobben |
| 7,841,836 | B2 | 11/2010 | Wobben |
| 7,854,594 | B2 | 12/2010 | Judge |
| 7,887,730 | B2 | 2/2011 | Karem |
| 7,891,941 | B2 | 2/2011 | Bevington et al. |
| 7,891,947 | B2 | 2/2011 | Chen et al. |
| 7,901,188 | B2 | 3/2011 | Llorente Gonzalez et al. |
| 7,922,454 | B1 | 4/2011 | Riddell |
| 7,931,444 | B2 | 4/2011 | Godsk et al. |
| 7,997,874 | B2 | 8/2011 | van der Bos |
| 7,998,303 | B2 | 8/2011 | Baehmann et al. |
| 8,075,275 | B2 | 12/2011 | Althoff et al. |
| 8,142,157 | B2 | 3/2012 | Kita et al. |
| 8,167,569 | B2 | 5/2012 | Livingston |
| 8,172,538 | B2 | 5/2012 | Hancock et al. |
| 8,172,539 | B2 | 5/2012 | Kootstra |
| 8,221,085 | B2 | 7/2012 | Livingston et al. |
| 8,231,351 | B2 | 7/2012 | Nies |
| 8,240,962 | B2 | 8/2012 | Livingston et al. |
| 8,328,516 | B2 | 12/2012 | Santiago et al. |
| 8,348,622 | B2 | 1/2013 | Bech |
| 8,356,982 | B2 | 1/2013 | Petri Larrea et al. |
| 8,393,871 | B2 | 3/2013 | Yarbrough |
| 8,409,381 | B2 * | 4/2013 | Ramm ................ F03D 1/0675 156/146 |
| 8,449,259 | B1 | 5/2013 | Kaser |
| 8,510,947 | B2 | 8/2013 | Kirkpatrick et al. |
| 8,511,996 | B2 | 8/2013 | Llorente Gonzalez et al. |
| 8,517,689 | B2 | 8/2013 | Kyriakides et al. |
| 8,562,296 | B2 | 10/2013 | Arocena De La Rua et al. |
| 8,632,310 | B2 * | 1/2014 | Marshall .............. B64C 27/473 416/226 |
| 8,807,954 | B2 | 8/2014 | Gill |
| 8,896,980 | B2 | 11/2014 | Kristensen et al. |
| 8,918,997 | B2 | 12/2014 | Kyriakides et al. |
| 9,051,921 | B2 | 6/2015 | Arocena De La Rua et al. |
| 9,133,818 | B2 | 9/2015 | Hayden et al. |
| 9,291,151 | B2 | 3/2016 | Mironov |
| 9,371,817 | B2 | 6/2016 | Olthoff |
| 9,422,916 | B2 * | 8/2016 | Schibsbye ............ B29C 70/443 |
| 9,494,132 | B2 | 11/2016 | Riddell et al. |
| 9,683,548 | B2 | 6/2017 | Johnson et al. |
| 9,702,339 | B2 * | 7/2017 | Liu ...................... F03D 1/0675 |
| 9,765,756 | B2 | 9/2017 | Hancock |
| 9,790,919 | B2 | 10/2017 | Leonard et al. |
| 9,945,354 | B2 | 4/2018 | Shair et al. |
| 10,495,058 | B2 | 12/2019 | Shain et al. |
| 10,961,982 | B2 | 3/2021 | Broome et al. |
| 2002/0168241 | A1 | 11/2002 | David et al. |
| 2003/0138290 | A1 | 7/2003 | Wobben |
| 2004/0265077 | A1 | 12/2004 | Boyl-Davis et al. |
| 2006/0060030 | A1 | 3/2006 | Lowder |
| 2006/0175731 | A1 | 8/2006 | Bech et al. |
| 2007/0018049 | A1 | 1/2007 | Stuhr |
| 2007/0231139 | A1 | 10/2007 | Yokoi |
| 2008/0069699 | A1 | 3/2008 | Bech |
| 2008/0145231 | A1 | 6/2008 | Llorente Gonzales et al. |
| 2008/0181733 | A1 | 7/2008 | Wright et al. |
| 2008/0232966 | A1 | 9/2008 | Wang et al. |
| 2009/0072439 | A1 | 3/2009 | Karem |
| 2009/0095141 | A1 | 4/2009 | Billings et al. |
| 2009/0116962 | A1 | 5/2009 | Pedersen et al. |
| 2009/0143207 | A1 | 6/2009 | Wampler et al. |
| 2009/0250847 | A1 | 10/2009 | Burchardt et al. |
| 2010/0122444 | A1 | 5/2010 | Reid et al. |
| 2010/0135814 | A1 | 6/2010 | Bakhuis et al. |
| 2010/0158694 | A1 | 6/2010 | Stam et al. |
| 2010/0266416 | A1 | 10/2010 | Marshall et al. |
| 2010/0304170 | A1 | 12/2010 | Frederiksen |
| 2011/0081247 | A1 | 4/2011 | Hibbard |
| 2011/0091326 | A1 | 4/2011 | Hancock |
| 2011/0142675 | A1 | 6/2011 | van der Bos |
| 2011/0158788 | A1 | 6/2011 | Bech et al. |
| 2011/0243736 | A1 | 10/2011 | Bell |
| 2011/0293432 | A1 | 12/2011 | Hibbard et al. |
| 2012/0014759 | A1 | 1/2012 | Sarh et al. |
| 2012/0027594 | A1 | 2/2012 | Lewke et al. |
| 2012/0082547 | A1 | 4/2012 | Baker et al. |
| 2012/0141287 | A1 | 6/2012 | Hynum et al. |
| 2012/0269643 | A1 | 10/2012 | Hibbard et al. |
| 2012/0308396 | A1 | 12/2012 | Hibbard |
| 2013/0219718 | A1 | 8/2013 | Busbey et al. |
| 2014/0166208 | A1 * | 6/2014 | Schubiger ............ B29C 66/1122 156/468 |
| 2014/0186189 | A1 | 7/2014 | Stege |
| 2014/0237793 | A1 | 8/2014 | Gamboa |
| 2015/0204193 | A1 | 7/2015 | Anasis et al. |
| 2015/0240780 | A1 | 8/2015 | Leonard et al. |
| 2015/0292477 | A1 | 10/2015 | Kratmann et al. |
| 2015/0369211 | A1 | 12/2015 | Merzhaeuser |
| 2016/0115939 | A1 | 4/2016 | Shair et al. |
| 2016/0163415 | A1 | 6/2016 | Wallenius et al. |
| 2016/0215757 | A1 | 7/2016 | Behmer et al. |
| 2016/0298608 | A1 | 10/2016 | Whitehouse et al. |
| 2016/0354968 | A1 | 12/2016 | Zamora Rodriguez et al. |
| 2017/0074236 | A1 | 3/2017 | Hynum et al. |
| 2017/0122287 | A1 | 5/2017 | Dobbe et al. |
| 2017/0268482 | A1 | 9/2017 | Beyland et al. |

(56) References Cited

U.S. PATENT DOCUMENTS

| | | | |
|---|---|---|---|
| 2018/0135596 A1 | 5/2018 | Herrig et al. | |
| 2018/0223796 A1 | 8/2018 | Yarbrough et al. | |
| 2018/0238300 A1 | 8/2018 | Shain et al. | |
| 2019/0136833 A1 | 5/2019 | Broome et al. | |
| 2020/0171768 A1 | 6/2020 | Murray et al. | |
| 2021/0340948 A1* | 11/2021 | Edge | B29D 99/0025 |
| 2024/0025135 A1* | 1/2024 | Kojima | B29D 99/0028 |

FOREIGN PATENT DOCUMENTS

| | | |
|---|---|---|
| EP | 1950414 A2 | 7/2008 |
| EP | 2390498 A1 | 11/2011 |
| EP | 2634418 A2 | 9/2013 |
| EP | 2334932 B1 | 10/2014 |
| EP | 3015703 A1 | 5/2016 |
| EP | 3040551 A1 | 7/2016 |
| EP | 2441951 B1 | 4/2017 |
| EP | 3425195 A1 | 1/2019 |
| JP | 2017207001 A | 11/2017 |
| NL | 9100816 A | 12/1992 |
| WO | WO 01/46582 A2 | 6/2001 |
| WO | WO2005/064156 A1 | 7/2005 |
| WO | WO2009/135902 A2 | 11/2006 |
| WO | WO2009/032195 A1 | 3/2009 |
| WO | WO2009/078871 A1 | 6/2009 |
| WO | WO2009/130467 A2 | 10/2009 |
| WO | WO2010/003847 A2 | 1/2010 |
| WO | WO2010/023140 A1 | 3/2010 |
| WO | WO2010/025830 A2 | 3/2010 |
| WO | WO2013/001458 A1 | 1/2013 |
| WO | WO2013/063760 A1 | 5/2013 |
| WO | WO2015011292 A1 | 1/2015 |
| WO | WO2015051803 A1 | 4/2015 |
| WO | WO2016/189092 A1 | 12/2016 |
| WO | WO2020/089241 A1 | 5/2020 |

* cited by examiner

METHOD OF JOINING SEGMENTS OF A COMPOSITE COMPONENT

FIELD

Applicant claims priority to and the benefit of PCT/IB2021/062272, having a filing date of Dec. 23, 2021, which claims priority to GB Application No. 2020710.6, having a filing date of Dec. 30, 2020. Both applications are incorporated herein by reference in their entirety.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to a power grid.

The construction of a modern rotor blade generally includes skin or shell segments, opposing spar caps, and one or more shear webs extending between the opposing spar caps. The skin is typically manufactured from layers of fiber composite and a lightweight core material and forms the exterior aerodynamic airfoil shape of the rotor blade. Further, the spar caps provide increased rotor blade strength by providing structural elements along the span of the rotor blade on both interior sides of the rotor blade. Moreover, spar caps are typically constructed from glass fiber reinforced composites, though spar caps for some larger blades may be constructed from carbon fiber reinforced composites. The shear web(s) generally include structural beam-like components that extend essentially perpendicular between the opposing spar caps and across the interior portion of the rotor blade between the outer skins. Typically, the various segments, components, and/or elements of the rotor blade may be adhered to one another via an adhesive. The quality of the adhesion and the alignment of the segments, components, and/or elements may impact the strength and/or performance of the finished rotor blade.

Thus, the art is continuously seeking new and improved systems and methods for joining segments of a composite component. As such, the present disclosure is directed to methods for employing a bladder assembly to facilitate the joining of rotor blade segments.

BRIEF DESCRIPTION

Aspects and advantages of the invention will be set forth in part in the following description, or may be obvious from the description, or may be learned through practice of the invention.

In one aspect, the present disclosure is directed to a method for joining rotor blade segments of a rotor blade. The method may include providing a first blade segment and positioning a bladder assembly on the first blade segment. The method may also include positioning an adhesive element in a first position on the first blade segment. Additionally, the method may include positioning a second blade segment with the first blade segment so as to define an inner cavity therebetween. The adhesive element and the bladder assembly may be within the inner cavity. The second blade segment may define a clearance relative to the adhesive element in the first position. Further, the method may include inflating the bladder assembly to apply a force to the adhesive element thereby causing the adhesive element to move from the first position to a second position that contacts the first blade segment and the second blade segment. With the adhesive in the second position, the adhesive element may be allowed to cure so as to secure the first blade segment to the second blade segment.

In an embodiment, the first blade segment may include a suction-side surface or a pressure-side surface, while the second blade segment may include an opposing suction-side surface or pressure-side surface. Additionally, positioning the adhesive element in the first position on the first blade segment may include placing the adhesive element onto the first blade segment and molding the adhesive element on the first blade segment so as to establish a first cross-sectional profile of the adhesive element in the first position.

In an additional embodiment, inflating the bladder assembly to apply a force to the adhesive element may change the first cross-sectional profile of the adhesive element in the first position to a second cross-sectional profile in the second position.

In a further embodiment, the bladder assembly may define a length extending between a first end and a second end. The bladder assembly may include an outer bladder configured to contact the adhesive element, a permeable liner positioned radially inward of the outer bladder, and an inner bladder positioned radially inward of the permeable liner.

In yet a further embodiment, the inner bladder may have a constant maximum diameter along the length.

In an embodiment, the inner bladder may include at least a first bladder portion and a second bladder portion. The first bladder portion may have a maximum diameter which is greater than a maximum diameter of the second bladder portion.

In an additional embodiment, the bladder assembly may include at least one condition sensor position along the length. The condition sensor(s) may be configured to record data indicative of temperature, pressure, and/or humidity within the inner cavity during the curing of the adhesive element.

In a further embodiment, the bladder assembly may include a labyrinthine structure having a plurality of preformed turns.

In yet a further embodiment, the method may include removing at least a portion of the bladder assembly from the inner cavity after allowing the adhesive element to cure.

In an embodiment, the method may include retaining at least a portion of the outer bladder within the inner cavity after allowing the adhesive element to cure.

In an additional embodiment, inflating the bladder assembly may include introducing a pressurized fluid into the bladder assembly via an access port, and maintaining the bladder assembly at a target pressure while allowing the adhesive element to cure.

In a further embodiment, the bladder assembly may include at least one pressure sensor for detecting a pressure value within the bladder assembly.

In yet a further embodiment, maintaining the bladder assembly at the target pressure may include reducing the pressurized fluid within the bladder assembly in response to an exothermic expansion of the adhesive element during the curing. Additionally, the method may include introducing an additional quantity of pressurized fluid into the bladder assembly in response to a contraction of the adhesive element while allowing the adhesive element to cure following the exothermic expansion.

In an embodiment, the target pressure may be at least six kilopascals and less than or equal to 14 kilopascals.

In an additional embodiment, the method may include, while inflating the bladder assembly, maintaining a target temperature within the inner cavity via the introduction of a quantity of heated fluid so as to increase a temperature within the inner cavity.

In a further embodiment, the method may include, while inflating the bladder simply, maintaining a target temperature within the inner cavity via the circulating of a quantity of ambient temperature or chilled fluid to decrease a temperature within the inner cavity.

In another aspect, the present disclosure is directed to a method for joining segments of a composite component. The method may include providing a first segment and positioning a bladder assembly on the first segment. Additionally, the method may include positioning an adhesive element in a first position on the first segment and positioning a second segment with the first segment so as to define an inner cavity therebetween. The adhesive element and the bladder assembly may be within the inner cavity. The second segment may define a clearance relative to the adhesive element in the first position. The method may also include inflating the bladder assembly to apply a force to the adhesive element, thereby causing the adhesive element to move from the first position to a second position that contacts the first segment and the second segment. Further, the method may include allowing the adhesive element to cure so as to secure the first segment to the second segment. The method may also include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
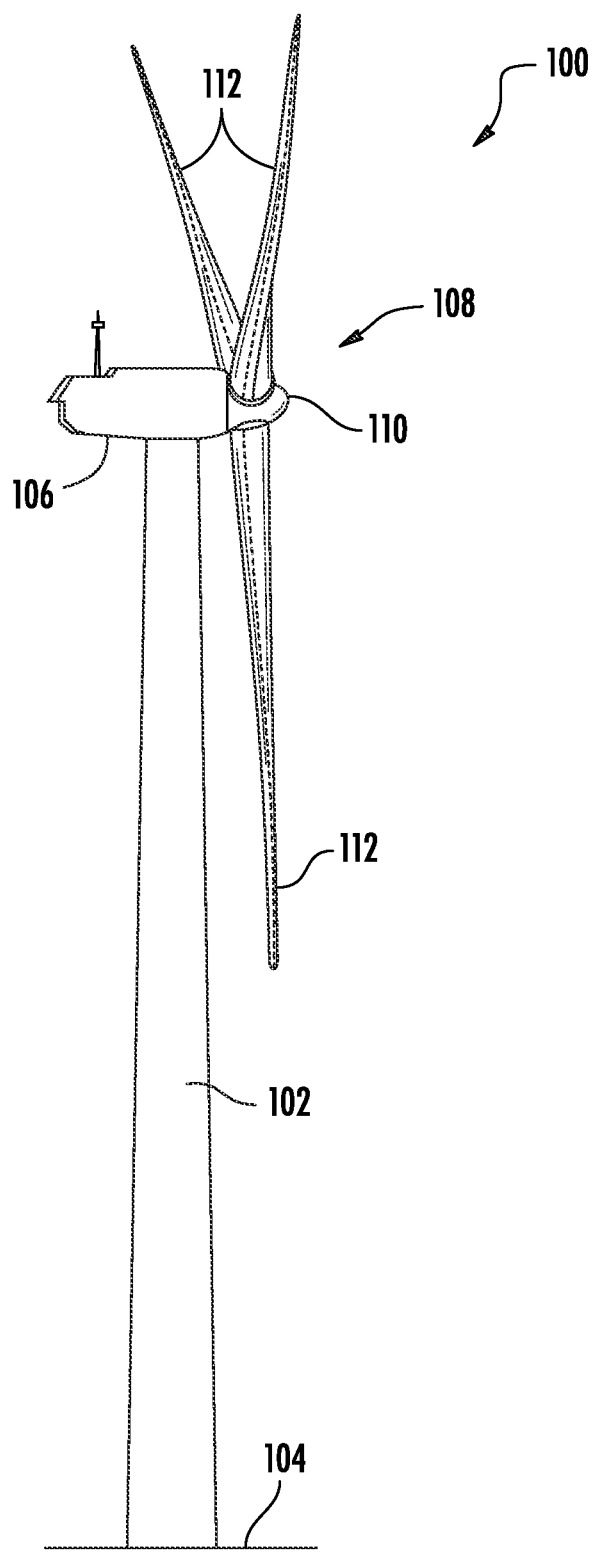
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for joining segments of a composite component, such as rotor blade segments of a composite rotor blade. When a composite component is formed from multiple segments, the segments may be adhered to one another via an adhesive. Typically, adhering two segments with adhesive may be achieved by placing excessive adhesive in the bond area and then bringing the two segments together with a significant amount of force and reinforcement. In other words, to ensure adhesive coverage, the bond area and/or a cavity between the segments may be overfilled. When joining the segments in this manner, the hydraulic resistance of the adhesive may be quite high over the length of a bond line. This hydraulic resistance may result in a sheer movement of one segment relative to another segment. As a result of the sheer movement, the segments of the composite component (e.g. the blade segments of a rotor blade) may be misaligned. It should be appreciated that the misalignment of segments may reduce the strength and/or serviceability of the resultant composite component or may necessitate a significant level of additional processing in order to make the composite component serviceable. Accordingly, the present disclosure presents novel systems and methods of joining segments of a composite component which facilitate the alignment and bringing together of the segments without requiring the overcoming of the hydraulic resistance.

In particular, the present disclosure includes systems and methods which effectively eliminate the hydraulic resistance which may be encountered when employing excessive adhesive to adhere the segments of the composite component. To achieve the desired adhesion of the segments without necessitating the overcoming of the hydraulic resistance, an adhesive element may be positioned in a first position on a first segment. The first position may be a location wherein the adhesive element does not encroach upon a contact region of the first segment. The adhesive element may have a composition and viscosity which resists sagging, and may, therefore, be formed to have a first cross-sectional profile when in the first position. A bladder assembly may also be positioned on the first segment adjacent to the adhesive element.

With the adhesive element in the first position, a second segment may be, positioned in contact with the contact region of the first segment. This positioning may include the arranging of the first and second segments in the alignment required for the final composite component. For example, when the composite component is a composite rotor blade, the first and second segments may be a pressure-side surface and a suction-side surface which align to form a trailing edge of the finished rotor blade.

The positioning of the second segment with the first segment may define an inner cavity therebetween, which may contain the adhesive element and the bladder assembly. However, when positioned with the first segment, the second segment may also define a clearance relative to the adhesive element. In other words, when the adhesive element is in the first position and has the first cross-sectional profile, the second segment may be aligned in a final position relative to the first segment without contacting the adhesive element. As such, the clearance between the adhesive element, in the first position, and the second segment may facilitate the alignment of the first and second segments without necessitating the overcoming of any hydraulic resistance.

In order to eliminate the clearance between the adhesive element and the second segment, and thereby adhere the first and second segments together, the bladder assembly may be inflated to apply a force to the adhesive element. This force may cause the adhesive element to move from the first position to a second position and/or to transition from the first cross-sectional profile to a second cross-sectional profile. When in the second position, the adhesive element may contact the first blade segment and the second blade segment. As such, when cured, the adhesive element may secure the first blade segment to the second blade segment.

It should be appreciated that, although the present subject matter will generally be described herein with reference to components of a wind turbine, the disclosed method may be generally used to bond any two or more composite parts along a joint.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator of an electrical system positioned within the nacelle 106 to permit electrical energy to be produced. It should be appreciated that the view of FIG. 1 is provided for illustrative purposes only to place the present invention in an exemplary field of use. It should also be appreciated that the invention is not limited to any particular type of wind turbine configuration.

Figure 2:
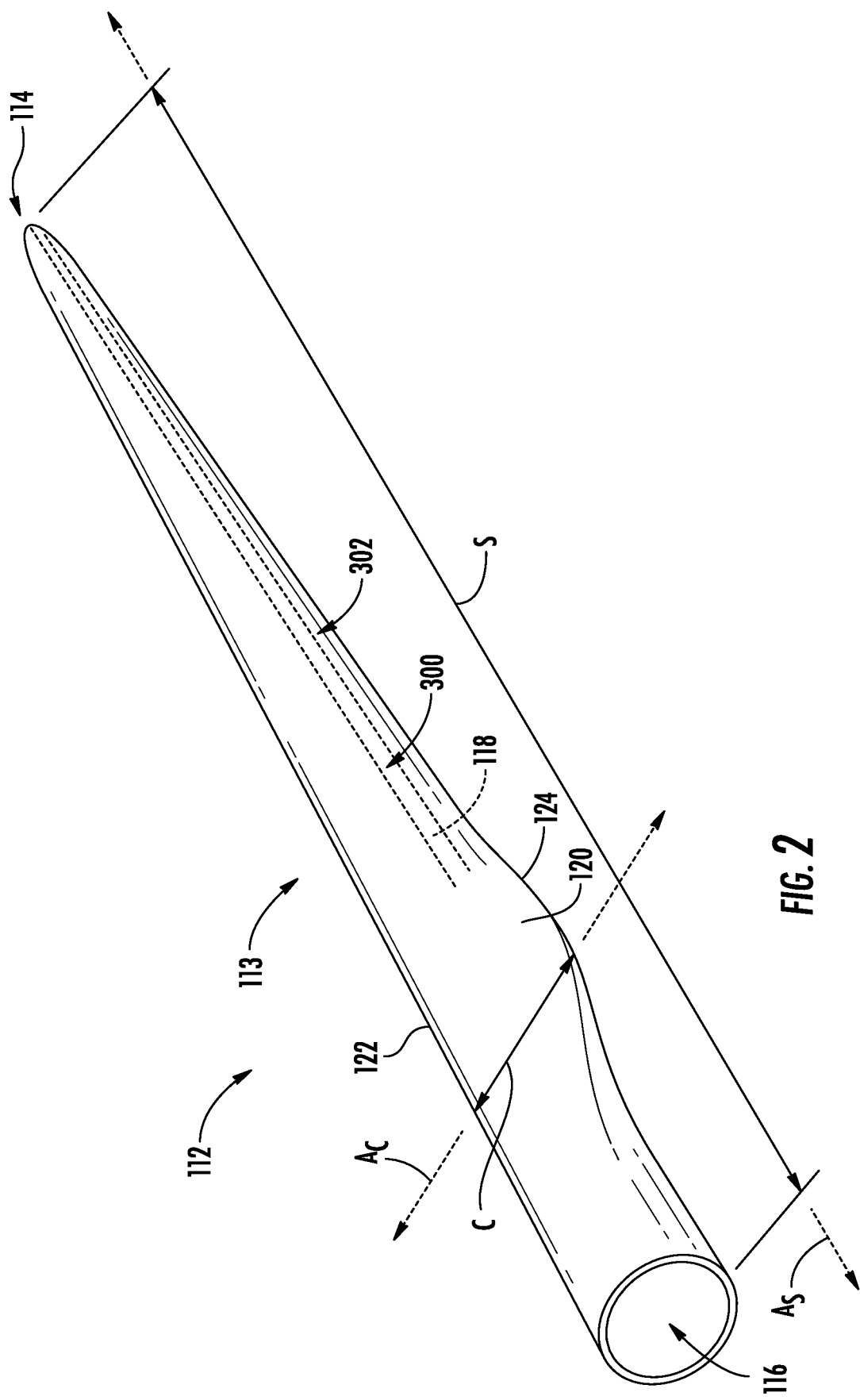
FIG. 2 illustrates a perspective view of one of the rotor blades of FIG. 1.
Figure 3:
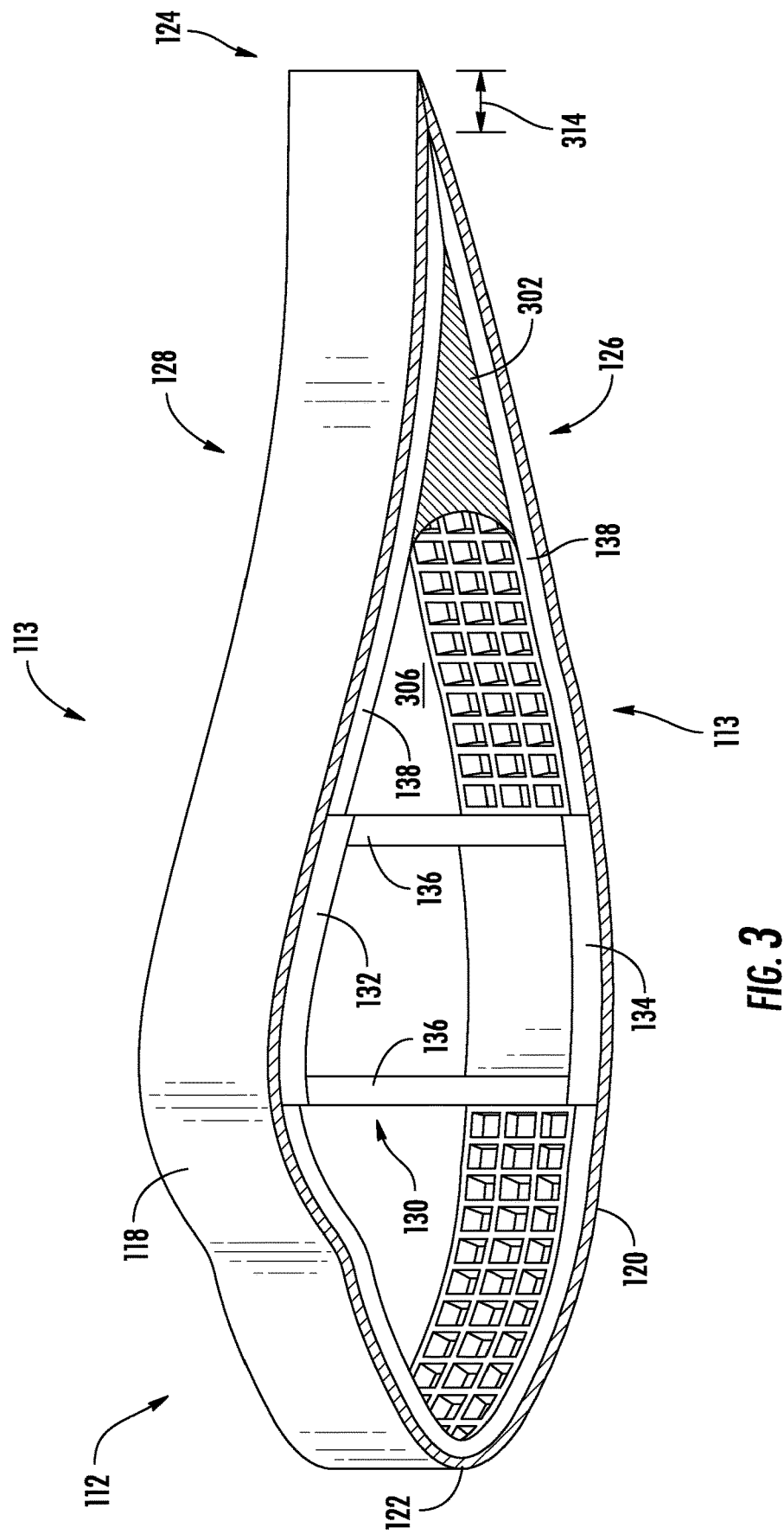
FIG. 3 illustrates a cross-sectional view of one embodiment of a segmented rotor blade according to the present disclosure.

Referring now to FIGS. 2 and 3, a perspective view and a cross-sectional view of one embodiment of a rotor blade 112 of the wind turbine 100 of FIG. 1 according to the present disclosure are shown. As shown, the rotor blade 112 may include a plurality of individual blade segments 113 distributed between blade tip 114 and a blade root 116. Each of the individual blade segments 113 may be uniquely configured so that the plurality of blade segments 113 define a complete rotor blade 112 having a designed aerodynamic profile, length, and other desired characteristics. For example, each of the blade segments 113 may have an aerodynamic contour that corresponds to the aerodynamic contour of adjacent blade segments 113. Thus, the aerodynamic contours of the blade segments may form a continuous aerodynamic contour of the rotor blade 112. As such, the rotor blade 112 may include any suitable number of segments 113.

In general, the rotor blade 112 may include a pressure-side surface 118 and a suction-side surface 120 extending between a leading edge 122 and a trailing edge 124. Additionally, the rotor blade 112 may have a span (S) extending along a span-wise axis (As) and a chord (C) extending along a chord-wise axis (Ac). Further, as shown, the chord (C) may change throughout the span (S) of the rotor blade 112. Thus, a local chord may be defined at any span-wise location on the rotor blade 112.

In an embodiment, the blade segments 113 may include, at least, a first blade segment 126 and a second blade segment 128. Further, as shown, the first blade segment 126 may include, for example, the pressure-side surface 118 or the suction-side surface 120. Moreover, as shown, the second blade segment 128 may include an opposing suction-side surface 120 or pressure-side surface 118.

As further depicted in FIG. 3, the rotor blade 112 may include one or more structural components, such as a box beam structure 130 that includes spar caps 132, 134 on either or both of the pressure or suction-side surfaces 118, 120 of the rotor blade 112. In addition, the rotor blade 112 may also include one or more shear webs 136 extending between the spar caps 132, 134. It should be understood that although a box beam configuration is shown, any other suitable structural configuration may also be included in the rotor blade 112. In addition, as shown, the pressure-side surface 118 and/or the suction-side surface 120 may be reinforced with a grid structure 138.

Figure 9:
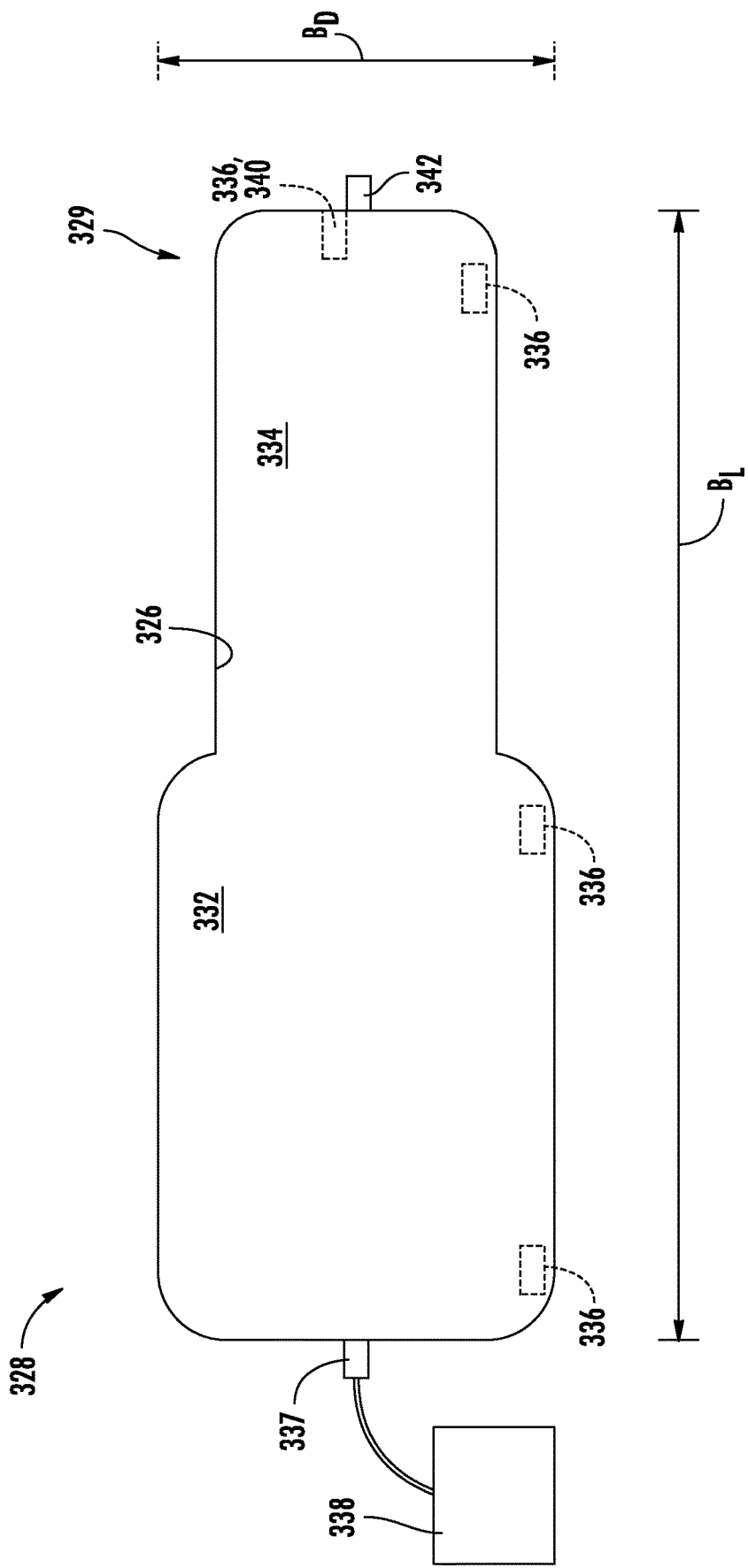
FIG. 9 illustrates a side view of one embodiment of the bladder assembly according to the present disclosure.
Figure 10:
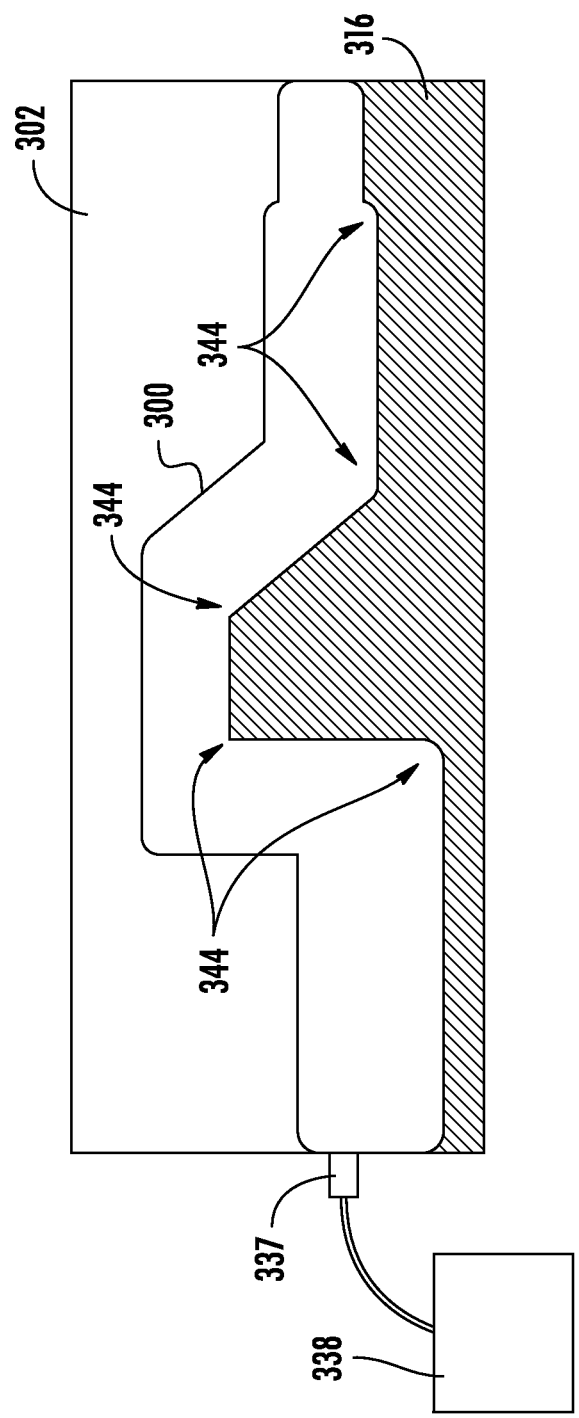
FIG. 10 illustrates a top view of one embodiment of the bladder assembly according to the present disclosure.
Figure 11:
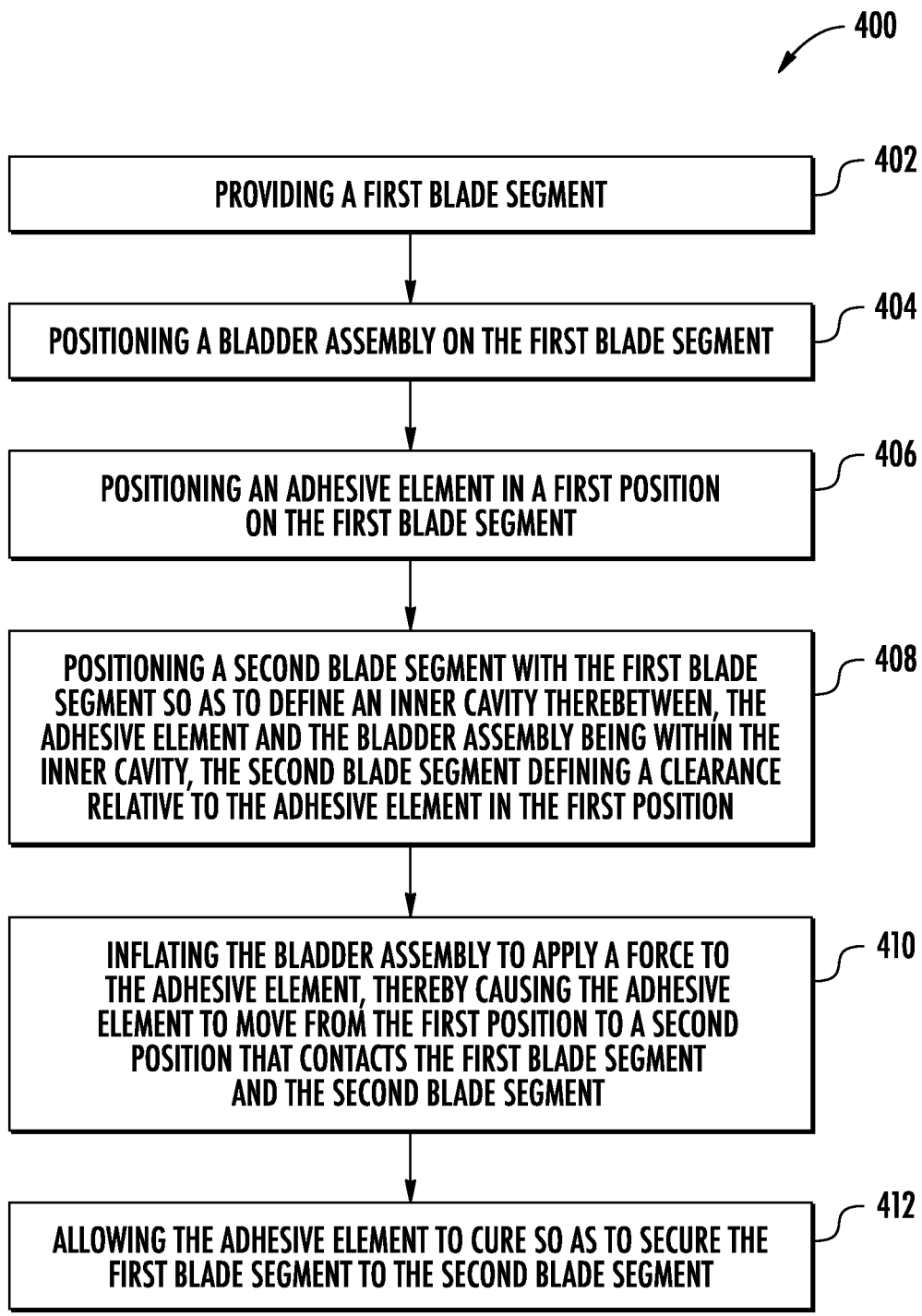
FIG. 11 illustrates a flow diagram of one embodiment of a method for joining rotor blade segments of a rotor blade according to the present disclosure.

Referring now to FIGS. 4-11 wherein multiple embodiments of a system and method 400 for joining rotor blade segments 113 of a rotor blade 112 according to the present disclosure are presented. For example, as shown in FIG. 11, a flow diagram of one embodiment of a method 400 for joining rotor blade segments 113 of the rotor blade 112 is illustrated. In general, the method 400 is described herein as relating to joining wind turbine rotor blades. However, it should be appreciated that the disclosed method 400 may be implemented using any other suitable rotor blades now known or later developed in the art and is also not limited to wind turbines. In addition, although FIG. 11 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways. Further, it should be appreciated that the disclosures provided herein may be particularly beneficial when forming a blind bond of the rotor blade 112 wherein the bonding area may be positioned within the rotor blade 112.

As shown at (402), the method 400 may include providing a first blade segment 126. As depicted at 404, the method 400 may include positioning a bladder assembly 300 on the first blade segment 126. Additionally, as depicted at 406, the method 400 may include positioning an adhesive element 302 in a first position 304 on the first blade segment 126, as particularly depicted in FIG. 4. As depicted at 408, the method 400 may include positioning the second blade segment 128 with the first blade segment 1267 as to define an inner cavity 306 therebetween. In an embodiment, the adhesive element 302 and the bladder assembly 300 may be positioned within the inner cavity 306. Additionally, the second blade segment 128 may define a clearance 308 relative to the adhesive element 302 in the first position 304. As further depicted at 410, the method 400 may include inflating the bladder assembly 300 to apply a force to the adhesive element 302 thereby causing the adhesive element to move from the first position 304 to a second position 310, as particularly depicted in FIGS. 5 and 6. The second position 310 may contact the first blade segment 126 and the second blade segment 128. Additionally, as depicted at 412, the method 400 may include allowing the adhesive element 302 to cure thereby securing the first blade segment 126 to the second blade segment 128. In an embodiment, the method 400 may also include removing at least a portion of the bladder assembly 300 from the inner cavity 306 after allowing the adhesive element 302 to cure Referring in particular to FIG. 4, wherein a cross-sectional depiction of an arrangement of blade segments 113, the adhesive element 302, and the bladder assembly 300 in accordance with an embodiment of the present disclosure is illustrated. As depicted, the adhesive element 302 may be molded to establish a first cross-sectional profile 312. In an embodiment, the adhesive element 302 may be both malleable and sag resistant. In other words, the adhesive element 302 may have a composition and viscosity which may permit the adhesive element 302 to retain the first cross-sectional profile 312 until acted upon by a compressive force. In an embodiment, the adhesive element 302 may be molded and then placed on the first blade segment 126 in a first position 304. However, in an additional embodiment, the adhesive element 302 may be placed on the first blade segment 126 and then molded to establish the first cross-sectional profile 312.

In an embodiment, the first position 304 may be a location wherein the adhesive element 302 does not encroach upon a contact region 314 of the first blade segment 126. The contact region 314 may include a portion of the first blade segment 126 formed to mate with a corresponding region of the second blade segment 128. In other words, the contact region 314 may represent the portion of the rotor blade 112 wherein the first and second blade segments 126, 128 are brought together into the desired alignment for the finished rotor blade 112 (or other composite component). It should be appreciated that the presence of an adhesive within the contact region 314, as is commonly practiced, may necessitate the overcoming of the hydraulic resistance of the adhesive when bringing the first and second blade segments 126, 128 together. It should, therefore, be further appreciated that the locating of the adhesive element 302 away from the contact region 314 in the first position 304 may facilitate the establishment of the desired alignment between the first and second blade segments 126, 128.

Figure 4:
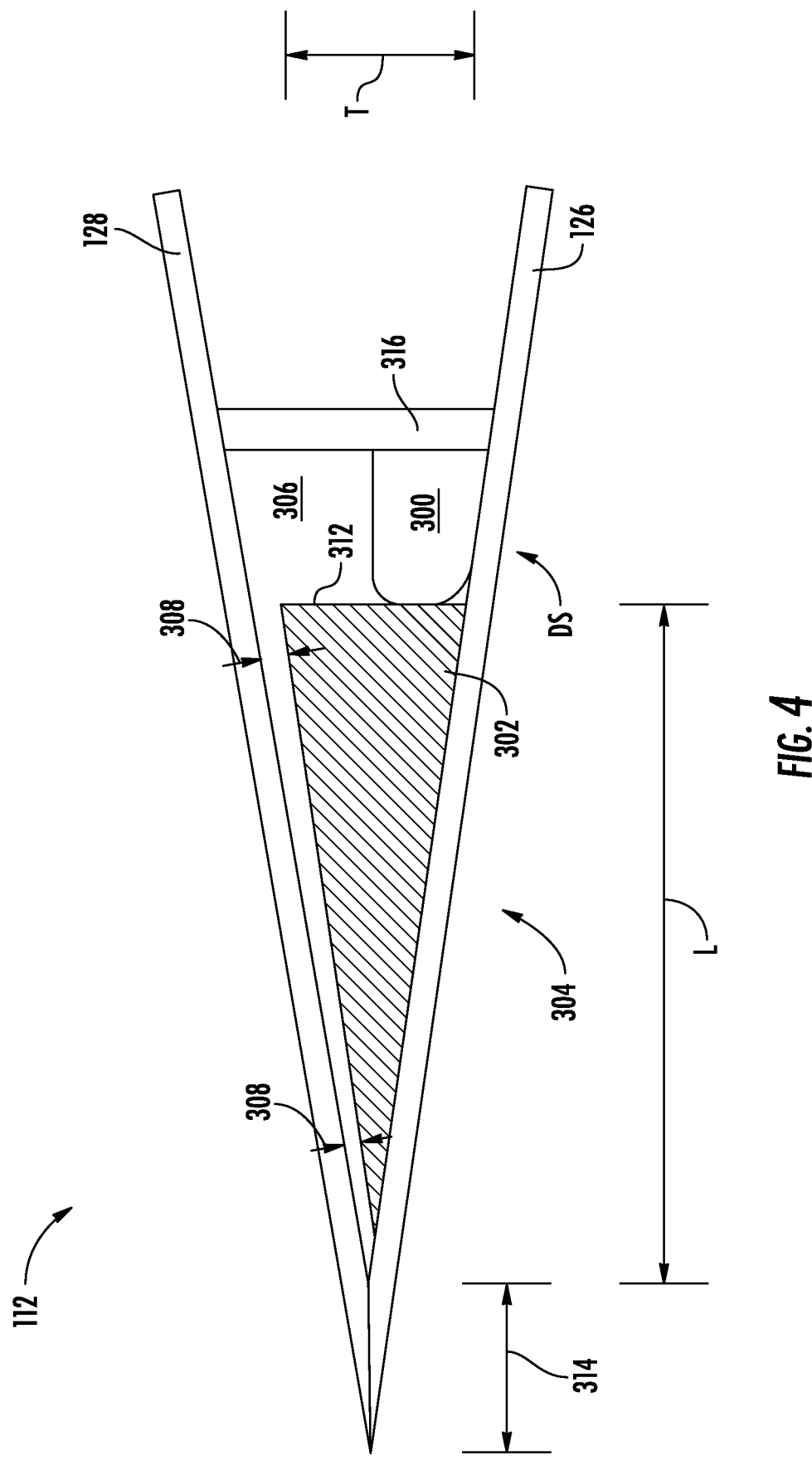
FIG. 4 illustrates a cross-sectional view of a portion of the rotor blade of FIG. 2 particularly illustrating an adhesive element in a first position according to the present disclosure.

In an embodiment, the bladder assembly 300 may be placed on the first blade segment 126. This positioning may place the bladder assembly 300 adjacent to the adhesive element 302 in the first position 304. As depicted in FIG. 4, the bladder assembly 300 may be placed on the first blade segment 126 in a deflated state (DS). It should be appreciated that the bladder assembly 300 may generally parallel the adhesive element 302.

In an embodiment, positioning the bladder assembly 300 adjacent to the adhesive element 302 may position the bladder assembly 300 between the adhesive element 302 and a constraining feature 316. The constraining feature 316 may be a structure which provides support for the bladder assembly 300 opposite the adhesive element 302. In other words, the bladder assembly 300 may be configured to react off of the constraining feature 316 to exert a force on the adhesive element 302. Accordingly, the constraining feature 316 may be coupled to, or integrally formed with, at least one of the first and second blade segments 126, 128. For example, the constraining feature 316 may, in an embodiment, be a shear web 136. In an additional embodiment, the constraining feature 316 may be an additively manufactured feature of the skin of the rotor blade 112, such as a protrusion, a bulkhead, or other similar feature. In an additional embodiment, the constraining feature 316 may be at least one bulkhead (e.g., a foam bulkhead, a balsa wood bulkhead, and/or any other suitable bulkhead) coupled to at least one of the first and second blade segments 126, 128. In yet a further embodiment, the constraining feature 316 may include a concavity of the first and/or second blade segments 126, 128. Additionally, in a further embodiment, the constraining feature 316 may be at least one adhesive strip configured to secure the bladder assembly 300 to the first blade segment 126.

Referring still to FIG. 4, in an embodiment, the second blade segment 128 may be positioned with the first blade segment 126. As mentioned previously, positioning the second blade segment 128 with the first blade segment 126 may include bringing a portion of the second blade segment 128 into contact with the first blade segment 126 at the contact region 314. For example, in an embodiment, the first blade segment 126 may be a suction-side surface 120 and the second blade segment 128 may be a pressure-side surface 118 which are brought together to form the trailing edge 124 of the rotor blade 112.

Positioning the second blade segment 128 with the first blade segment 126 may, in an embodiment, also define an inner cavity 306 between the first blade segment 126 and the second blade segment 128. The inner cavity 306 may be a constrained space containing at least the adhesive element 302 and the bladder assembly 300. In an embodiment, the inner cavity 306 may, for example, extend in a span-wise direction generally parallel to the trailing edge 124. In an embodiment, the inner cavity 306 may be bounded by the first blade segment 126, the second blade segment 128, and the constraining feature 316. It should be appreciated that the cross-sectional shape of the inner cavity 306 may be determined, at least in part, by the desired final shape of the composite component. For example, in an embodiment, the inner cavity 306 may be a hollow portion of the rotor blade 112 defined, at least in part, by the pressure-side surface 118 and the suction-side surface 120.

Figure 5:
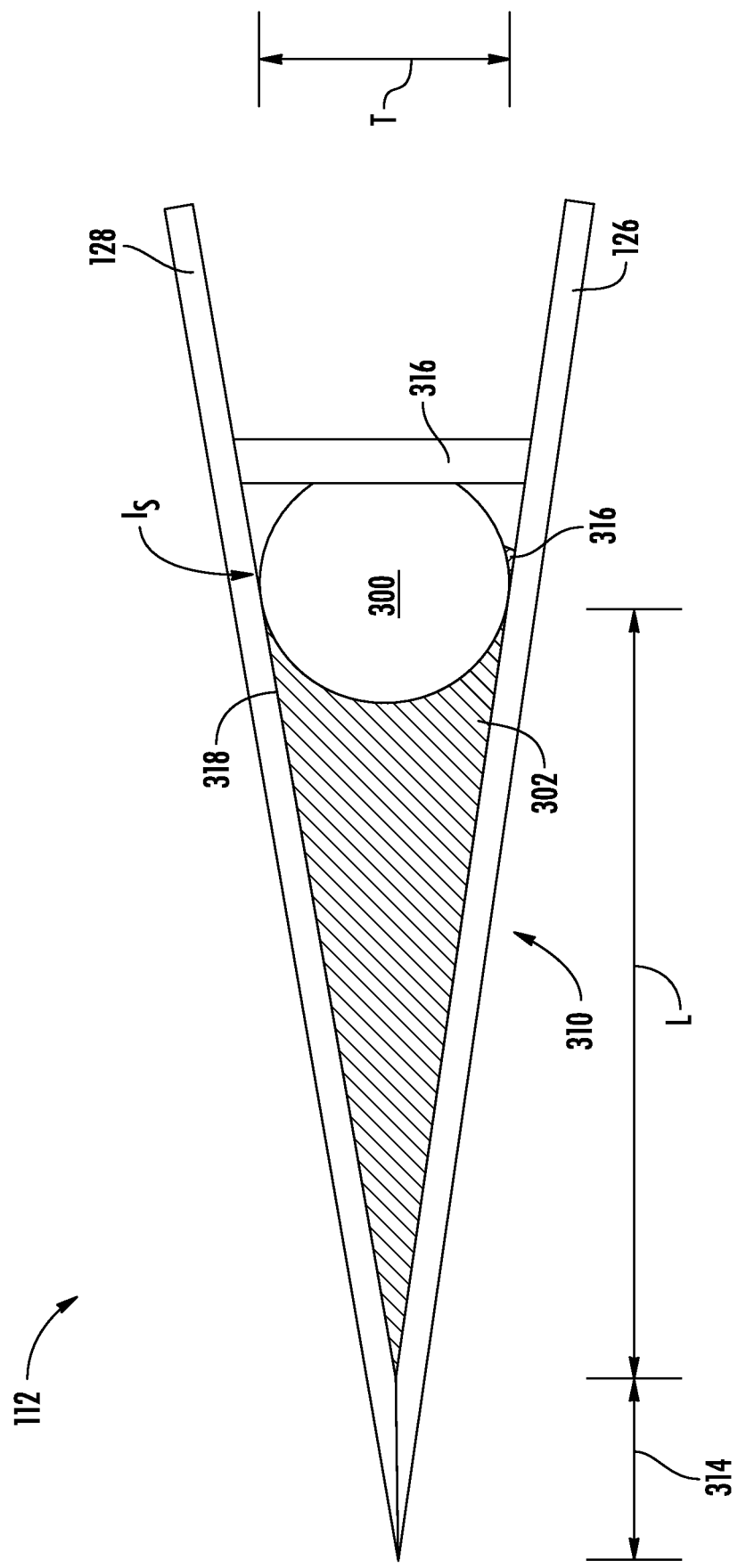
FIG. 5 illustrates a cross-sectional view of a portion of the rotor blade of FIG. 2 particularly illustrating an adhesive element in a second position according to the present disclosure.
Figure 6:
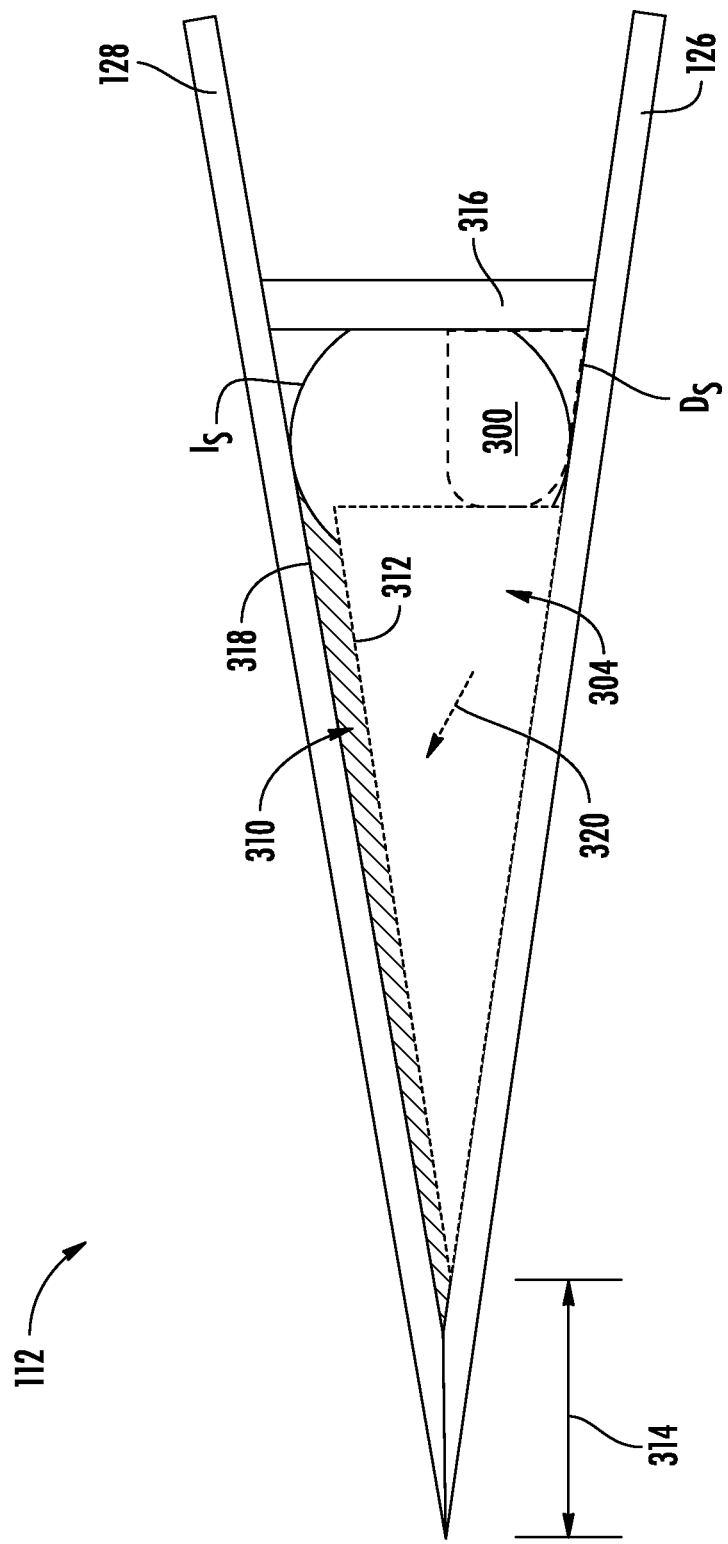
FIG. 6 illustrates a cross-sectional view of a portion of the rotor blade of FIG. 2 particularly illustrating a transition of the adhesive element from the first position to the second position according to the present disclosure.

As depicted in FIGS. 5 and 6, in an embodiment, the bladder assembly 300 may be transitioned from the deflated state (DS) to an inflated state (IS) via the introduction of a non-oxidative/nonflammable fluid (e.g., air, nitrogen, etc.). In an embodiment, the bladder assembly 300 may be inflated to a pressure of at least six kilopascals and less than or equal to 14 kilopascals. It should be appreciated that limiting the inflation pressure of the bladder assembly 300 to less than or equal to 14 kilopascals may facilitate compliance with safety regulations and may mitigate risks to personnel in the event of an unanticipated decompression of the bladder assembly 300.

In an embodiment, inflating the bladder assembly 300 may apply a force to the adhesive element 302 which may change the first cross-sectional profile 312 of the adhesive element 302 in the first position 304 to a second cross-sectional profile 318 in the second position 310. In other words, applying a force to the adhesive element 302 via the bladder assembly 300 may alter the cross-sectional shape and/or position of the adhesive element 302 relative to the first and second blade segments 126, 128. For example, at a given span-wise location, a maximal thickness (T) of second cross-sectional profile 318 may be greater than the maximal thickness (T) of the first cross-sectional profile 312 at the same span-wise location. Additionally, in an embodiment, the chord-wise length (L) of the second cross-sectional profile 318 may be less than the chord-wise length (L) of the first cross-sectional profile 312.

It should be appreciated that the generally wedge-shaped depictions of the first and second cross-sectional profiles 312, 318 are exemplary cross-sectional shapes and that the first and second cross-sectional profiles 312, 318 may be formed to have any suitable cross-sectional shape. In the first position 304, the suitable cross-sectional shape may be any shape which maintains the clearance 308 between the adhesive element 302 and the second blade segment 128. In the second position, the adhesive element may be brought into contact with both the first and second blade segments. Therefore, the suitable shape may be determined by the opposing faces of the first and second blade segments 126, 128.

In an embodiment, transitioning the adhesive element 302 into second cross-sectional profile 318 and/or to the second position 310 may eliminate the clearance 308 between the adhesive element 302 and the second blade segment 128. Therefore, the transitioning of the adhesive element 302 (as indicated by arrow 320) in response to the application of force by the bladder assembly 300 may result in the positioning of the adhesive element 302 in contact with both the first and second blade segments 126, 128, thereby facilitating the bonding of the first blade segment 126 to the second blade segment 128.

Figure 7:
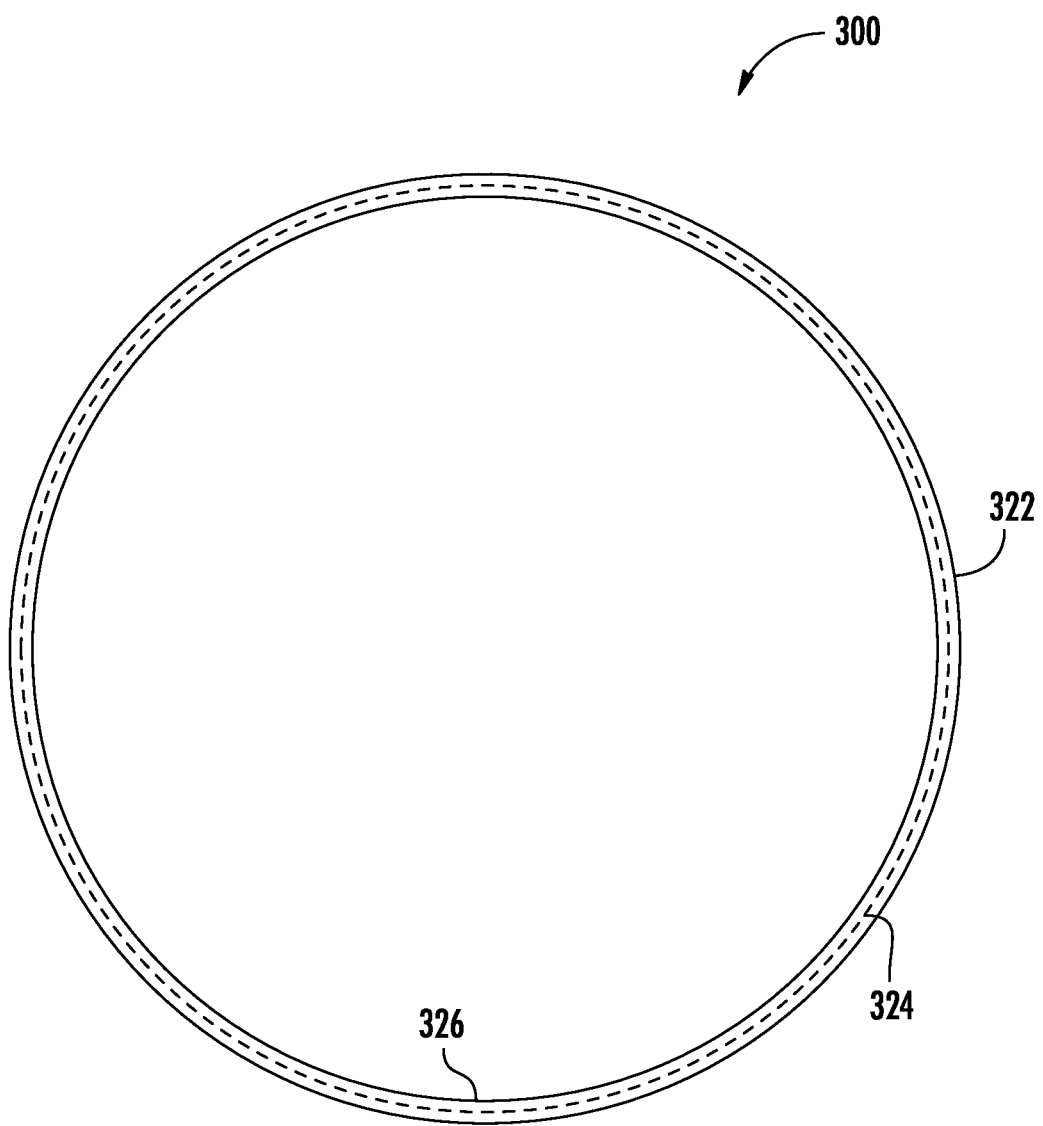
FIG. 7 illustrates a cross-sectional view of a bladder assembly according to the present disclosure.

Referring now to FIG. 7, wherein a cross-sectional depiction of the bladder assembly 300 in accordance with an embodiment of the present disclosure is illustrated. As depicted in FIG. 7, in an embodiment, the bladder assembly 300 may include an outer bladder 322 configured to contact the adhesive element 302. In an embodiment, at least a portion of the outer bladder 322 may be retained within the inner cavity 306 after allowing the adhesive element 302 to cure.

In an embodiment, a permeable liner 324 may be positioned radially inward of the outer bladder 322. The permeable liner 324 may be formed from a material configured to permit the passage of a quantity of fluid via a plurality of pathways. The permeable liner 324 may be formed with a woven structure, an open grid structure, an open cell structure, and/or any other structure suitable to establish the plurality of pathways. For example, in an embodiment, the permeable liner 324 may be a woven cloth or formed mesh configured to facilitate the passage of air.

Referring still to FIG. 7, in an embodiment, the bladder assembly 300 may also include an inner bladder 326 positioned radially inward of the permeable liner 324. The outer and inner bladders 322, 326 may be fluid impermeable. For example, the outer and inner bladders 322, 326 may be formed from latex, silicone, plastic, or other suitable material or combination of materials. For example, in an embodiment wherein the outer and inner bladders 322, 326 may be formed from plastic, the plastic may be a polyethylene plastic (e.g. LLDPE plastic). The outer and inner bladders 322, 326 may have a thickness of two millimeters or less, such as less than 0.5 millimeters. It should be appreciated that reducing the thickness of the outer and inner bladders 322, 326 may reduce the weight of the bladder assembly 300 and may facilitate the retention of at least a portion of the bladder assembly 300 in the composite component following assembly. Further, the utilization of thin plastics (e.g. less than 0.5 millimeters) may reduce the cost of the bladder assembly 300 relative to a bladder employing thicker plastics.

It should be appreciated that the disposition of the permeable liner 324 between the outer and inner bladders 322, 326 may facilitate the passage of a fluid between the outer and inner bladders 322, 326. Accordingly, in an embodiment wherein the inner bladder 326 develops a leak, the portion of fluid escaping the inner bladder 326 may be transmitted along the permeable layer 324 and expelled from the bladder assembly 300 outside of the rotor blade 112. This, in turn, may preclude the introduction of a fluid flow into the adhesive element 302 should the outer bladder 322 be perforated in some manner.

Figure 8:
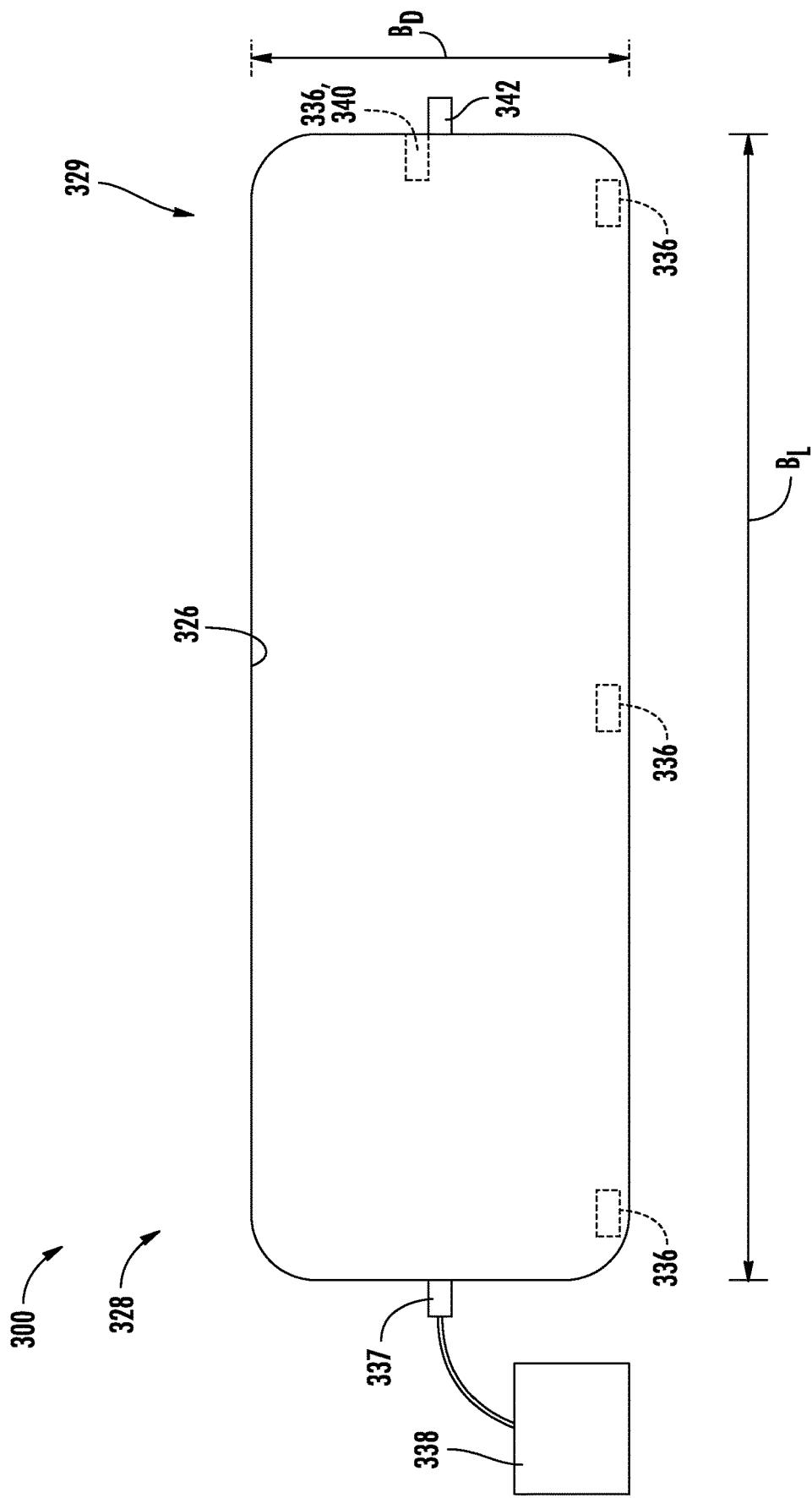
FIG. 8 illustrates a side view of one embodiment of the bladder assembly according to the present disclosure.

Referring now to FIGS. 8-9 wherein side-view depictions of the bladder assembly 300 in accordance with embodiments of the present disclosure are illustrated. As depicted, in an embodiment, the bladder assembly 300 may define a length (BL) (e.g. a bladder length) extending between a first end 328 and a second end 329. In an embodiment, the inner bladder 326 may, as depicted in FIG. 8, have a constant maximum diameter (BD) (e.g. bladder diameter) along the length (BL).

In an additional embodiment, such as particularly depicted in FIG. 9, the inner bladder 326 may include at least a first bladder portion 332 and a second bladder portion 334. In such an embodiment, the first bladder portion 332 may have a maximum diameter (BD) which is greater than a maximum diameter (BD) of the second bladder portion 334. It should be appreciated that the utilization of bladder portions of differing maximum diameters may facilitate the conforming of the bladder assembly 300 to the inner cavity 306. It should also be appreciated that the utilization of bladder portions of differing maximum diameters may facilitate the application of differing force magnitudes at differing span-wise locations.

Referring still to FIGS. 8 and 9, in an embodiment, the bladder assembly 300 may also include at least one condition sensor 336 positioned along the length (BL). The condition sensor(s) 336 may be configured to monitor/record data indicative of a temperature, pressure, and/or humidity within the inner cavity 306. For example, in an embodiment, the condition sensor(s) 336 may be configured to acquire the indicated data during the curing of the adhesive element 302. Accordingly, the condition sensor(s) 336 may, in various embodiments, be a thermometer, a pressure sensor, a hygrometer, and/or a combination thereof.

In an embodiment, the bladder assembly 300 may also include at least one access port 337 operably coupled to the inner bladder 326. The access port(s) 337 may also be operably coupled to a pressurized fluid source 338. The pressurized fluid source 338 may be a tank and/or a pump configured to introduce the nonoxidative/nonflammable fluid into the bladder assembly 300 (e.g. into the inner bladder 326) via the access port(s) 337. In an embodiment, the bladder assembly 300 may be a closed system so that a single portion of fluid may be introduced to establish the target pressure within the bladder assembly 300. In an embodiment, the target pressure may be maintained within the bladder assembly while allowing the adhesive element 302 to cure.

In an additional embodiment, the bladder assembly 300 may be configured as an open, or semi-open, system wherein the bladder assembly 300 also includes at least one outlet valve 342. The outlet valve(s) 342 may be configured to permit the expelling of at least a portion of the fluid from within the bladder assembly 300. In such an embodiment, the pressurized fluid source 338 may be configured to maintain a flow of the pressurized fluid into the inner bladder 326 via the access port(s) 337 and out of the bladder assembly 300 via the outlet valve(s) 342. Accordingly, in an embodiment, the bladder assembly 300 may also include at least one pressure sensor 340 configured to detect a pressure value within the bladder assembly 300. In such an embodiment, the pressure detected by the pressure sensor(s) 340 may be utilized to set a flow rate for the pressurized fluid source 338 in order to maintain the bladder assembly 300 at the target pressure while allowing the adhesive element 302 to cure.

In an embodiment, the quantity of the pressurized fluid within the bladder assembly 300 may be reduced in response to the detection of an exothermic expansion of the adhesive element 302 during the curing. For example, in an embodiment, the condition sensor(s) 336 may detect an increase in the temperature and/or the pressure within the bladder assembly 300 which may be indicative of the exothermic expansion. In response to this detection, a quantity of the pressurized fluid within the inner bladder 326 may be expelled from the bladder assembly 330 via the outlet valve(s) 342 in order to maintain the pressure within the bladder assembly 330 at the target pressure (e.g. less than or equal to 14 kilopascals).

In a further embodiment, an additional quantity of the pressurized fluid may be introduced into the bladder assembly in response to the detection of a contraction of the adhesive element 302. For example, in an embodiment, the adhesive element 302 may contract following an exothermic expansion. This contraction may necessitate the introduction of the additional quantity of pressurized fluid in order to maintain the target pressure (e.g., at least six kilopascals). It should be appreciated that in an embodiment, the cure cycle of the adhesive element 302 may first necessitate the reduction of the pressurized fluid within the bladder assembly 300 during a period of exothermic expansion. This may be followed by a necessity to introduce an additional quantity of the pressurized fluid during a period of contraction following the period of exothermic expansion in order to maintain the target pressure throughout the cure cycle.

In an embodiment, the method 400 may include employing the pressurized fluid to maintain target temperature within the inner cavity 306. Accordingly, in an embodiment, while inflating the bladder assembly 300, the target temperature may be maintained via the introduction of a quantity of heated gas. By introducing a quantity of heated fluid into the inner bladder 326, the temperature, within the inner cavity 306 may be increased. This increase in temperature may be monitored by the condition sensor(s) 336 and the quantity and/or temperature of the heated fluid introduced into the bladder assembly 300 may be adjusted as necessary to maintain the target temperature. It should be appreciated that increasing the temperature within the cavity 306 may facilitate the curing of the adhesive element 302. For example, the heating of the inner cavity 306 may establish a generally uniform temperature gradient within the inner cavity 306. The generally uniform temperature gradient may facilitate a more even cure than may otherwise be obtainable. Additionally, the heating of the inner cavity 306 may, in an embodiment, accelerate the cure rate of the adhesive element 302.

In a further embodiment, employing the pressurized fluid to maintain a target temperature within the inner cavity 306 may include circulating a quantity of the pressurized fluid at, or below (e.g. chilled), the ambient temperature through the bladder assembly 300 in order to decrease the temperature within the inner cavity 306. For example, in an embodiment, the condition sensor(s) 336 may detect a temperature within the inner cavity 306 which may exceed a temperature threshold. The temperature threshold may be indicative of a temperature above which the adhesive element 302 may develop an inconsistent cure or other undesirable characteristic. In an additional embodiment, it may be desirable to slow the cure rate of the adhesive element 302 by reducing the ambient temperature. In either embodiment, the circulation of the pressurized fluid through the bladder assembly 300 may develop a cooling effect within the inner cavity 306.

Referring now to FIG. 10 wherein a top view of a depiction of an arrangement of the adhesive element 302, the bladder assembly 300, and the constraining feature 316 in accordance with an embodiment of the present disclosure is illustrated. As depicted, in an embodiment, the bladder assembly 300 may be formed to have a labyrinthine structure. The labyrinthine structure may, in an embodiment, include a plurality of pre-formed turns 344. It should be appreciated that the plurality of pre-formed turns 344 may facilitate the conforming of the bladder assembly 300 to the constraining feature 316. This may, in turn, facilitate the application of an even force upon the adhesive element 302. In an additional embodiment, however, the utilization of the labyrinthine structure may facilitate the tailoring of the force applied to the adhesive element 302 at various span-wise locations of the rotor blade 112.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for joining rotor blade segments of a rotor blade, the method comprising: providing a first blade segment; positioning a bladder assembly on the first blade segment; positioning an adhesive element in a first position on the first blade segment; positioning a second blade segment with the first blade segment so as to define an inner cavity therebetween, the adhesive element and the bladder assembly being within the inner cavity, the second blade segment defining a clearance relative to the adhesive element in the first position; inflating the bladder assembly to apply a force to the adhesive element, thereby causing the adhesive element to move from the first position to a second position that contacts the first blade segment and the second blade segment; and allowing the adhesive element to cure so as to secure the first blade segment to the second blade segment.

Clause 2. The method of clause 1, wherein the first blade segment comprises one of a suction-side surface or a pressure-side surface, while the second blade segment comprises an opposing suction-side surface or pressure-side surface, and wherein positioning the adhesive element in the first position on the first blade segment further comprises: placing the adhesive element onto the first blade segment; and molding the adhesive element so as to establish a first cross-sectional profile of the adhesive element when in the first position.

Clause 3. The method of any preceding clause, wherein inflating the bladder assembly to apply the force to the adhesive element changes the first cross-sectional profile of the adhesive element in the first position to a second cross-sectional profile in the second position.

Clause 4. The method of any preceding clause, wherein the bladder assembly defines a length extending between a first end and a second end, the bladder assembly comprising: an outer bladder configured to contact the adhesive element; a permeable liner positioned radially inward of the outer bladder; and an inner bladder positioned radially inward of the permeable liner.

Clause 5. The method of any preceding clause, wherein the inner bladder has a constant maximum diameter along the length.

Clause 6. The method of any preceding clause, wherein the inner bladder comprises at least a first bladder portion and a second bladder portion, the first bladder portion having a maximum diameter which is greater than a maximum diameter of the second bladder portion.

Clause 7. The method of any preceding clause, wherein the bladder assembly further comprises: at least one condition sensor positioned along the length, wherein the at least one condition sensor is configured to record data indicative of at least one of temperature, pressure, and humidity within the inner cavity during the curing of the adhesive element.

Clause 8. The method of any preceding clause, wherein the bladder assembly further comprises a labyrinthine structure comprising a plurality of pre-formed turns.

Clause 9. The method of any preceding clause, further comprising: removing at least a portion of the bladder assembly from the inner cavity after allowing the adhesive element to cure.

Clause 10. The method of any preceding clause, further comprising: retaining at least a portion of outer bladder within the inner cavity after allowing the adhesive element to cure.

Clause 11. The method of any preceding clause, wherein inflating the bladder assembly comprises: introducing a pressurized fluid into the bladder assembly via an access port; and maintaining the bladder assembly at a target pressure while allowing the adhesive element to cure.

Clause 12. The method of any preceding clause, wherein the bladder assembly comprises at least one pressure sensor for detecting a pressure value within the bladder assembly.

Clause 13. The method of any preceding clause, wherein maintaining the bladder assembly at the target pressure further comprises: reducing the pressurized fluid within the bladder assembly in response to an exothermic expansion of the adhesive element during the curing; and introducing an additional quantity of pressurized fluid into the bladder assembly in response to a contraction of the adhesive element while allowing the adhesive element to cure following the exothermic expansion.

Clause 14. The method of any preceding clause, wherein the target pressure is at least six kilopascals and less than or equal to 14 kilopascals.

Clause 15. The method of any preceding clause, further comprising: while inflating the bladder assembly, maintaining a target temperature within the inner cavity via the introduction of a quantity of heated fluid so as to increase a temperature within the inner cavity.

Clause 16. The method of any preceding clause, further comprising: while inflating the bladder assembly, maintaining a target temperature within the inner cavity via the circulating of a quantity of ambient temperature or chilled fluid to decrease a temperature within the inner cavity.

Clause 17. A method for joining segments of a composite component, the method comprising: providing a first segment; positioning a bladder assembly on the first segment; positioning an adhesive element in a first position on the first segment; positioning a second segment with the first segment so as to define an inner cavity therebetween, the adhesive element and the bladder assembly being within the inner cavity, the second segment defining a clearance relative to the adhesive element in the first position; inflating the bladder assembly to apply a force to the adhesive element, thereby causing the adhesive element to move from the first position to a second position that contacts the first segment and the second segment; and allowing the adhesive element to cure so as to secure the first segment to the second segment.

Clause 18. The method of any preceding clause, wherein positioning the adhesive element in the first position on the first segment further comprises: placing the adhesive element onto the first segment; and molding the adhesive element so as to establish a first cross-sectional profile of the adhesive element when in the first position, wherein inflating the bladder assembly to apply the force to the adhesive element changes a first cross-sectional profile of the adhesive element in the first position to a second cross-sectional profile in the second position.

Clause 19. The method of any preceding clause, wherein the bladder assembly defines a length extending between a first end and a second end, the bladder assembly comprising: an outer bladder configured to contact the adhesive element; a permeable liner positioned radially inward of the outer bladder; and an inner bladder positioned radially inward of the permeable liner.

Clause 20. The method of any preceding clause, wherein inflating the bladder assembly comprises: introducing a pressurized fluid into the bladder assembly via an access port; and maintaining the bladder assembly at a target pressure while allowing the adhesive element to cure.

What is claimed is:

1. A method for joining rotor blade segments of a rotor blade, the method comprising:
   providing a first blade segment;
   positioning a bladder assembly on the first blade segment;
   positioning an adhesive element in a first position on the first blade segment;
   positioning a second blade segment with the first blade segment so as to define an inner cavity therebetween, the adhesive element and the bladder assembly being within the inner cavity, the second blade segment defining a clearance relative to the adhesive element in the first position;
   inflating the bladder assembly to apply a force to the adhesive element, thereby causing the adhesive element to move from the first position to a second position that contacts the first blade segment and the second blade segment; and
   allowing the adhesive element to cure so as to secure the first blade segment to the second blade segment.

2. The method of claim 1, wherein the first blade segment comprises one of a suction-side surface or a pressure-side surface, and wherein the second blade segment comprises an opposing suction-side surface or pressure-side surface, and wherein positioning the adhesive element in the first position on the first blade segment further comprises:
   molding the adhesive element so as to establish a first cross-sectional profile of the adhesive element when in the first position on the first blade segment.

3. The method of claim 2, wherein inflating the bladder assembly to apply the force to the adhesive element changes the first cross-sectional profile of the adhesive element in the first position to a second cross-sectional profile in the second position.

4. The method of claim 1, wherein the bladder assembly defines a length extending between a first end and a second end, the bladder assembly comprising:
   an outer bladder configured to contact the adhesive element;
   a permeable liner positioned radially inward of the outer bladder; and
   an inner bladder positioned radially inward of the permeable liner.

5. The method of claim 4, wherein the inner bladder has a constant maximum diameter along the length.

6. The method of claim 4, wherein the inner bladder comprises at least a first bladder portion and a second bladder portion, the first bladder portion having a maximum diameter which is greater than a maximum diameter of the second bladder portion.

7. The method of claim 4, wherein the bladder assembly further comprises:
   at least one condition sensor positioned along the length, wherein the at least one condition sensor is configured to record data indicative of at least one of temperature, pressure, and humidity within the inner cavity during the curing of the adhesive element.

8. The method of claim 4, wherein the bladder assembly further comprises a labyrinthine structure comprising a plurality of pre-formed turns.

9. The method of claim 4, further comprising:
   removing at least a portion of the bladder assembly from the inner cavity after allowing the adhesive element to cure.

10. The method of claim 9, further comprising:
    retaining at least a portion of the outer bladder within the inner cavity after allowing the adhesive element to cure.

11. The method of claim 1, wherein inflating the bladder assembly comprises:
    introducing a pressurized fluid into the bladder assembly via an access port; and
    maintaining the bladder assembly at a target pressure while allowing the adhesive element to cure.

12. The method of claim 11, wherein maintaining the bladder assembly at the target pressure further comprises:
    reducing the pressurized fluid within the bladder assembly in response to an exothermic expansion of the adhesive element during the curing; and
    introducing an additional quantity of pressurized fluid into the bladder assembly in response to a contraction of the adhesive element while allowing the adhesive element to cure following the exothermic expansion.

13. The method of claim 1, further comprising detecting a pressure value within the bladder assembly via at least one pressure sensor.

14. The method of claim 1, further comprising:
    while inflating the bladder assembly, maintaining a target temperature within the inner cavity by at least one of introducing a quantity of heated fluid so as to increase a temperature within the inner cavity or circulating a quantity of ambient temperature fluid or chilled fluid to decrease a temperature within the inner cavity.

* * * * *